W. Bryant,
Reciprocating Saw Mill.
Nº 2,127.                 Patented June 11, 1841.
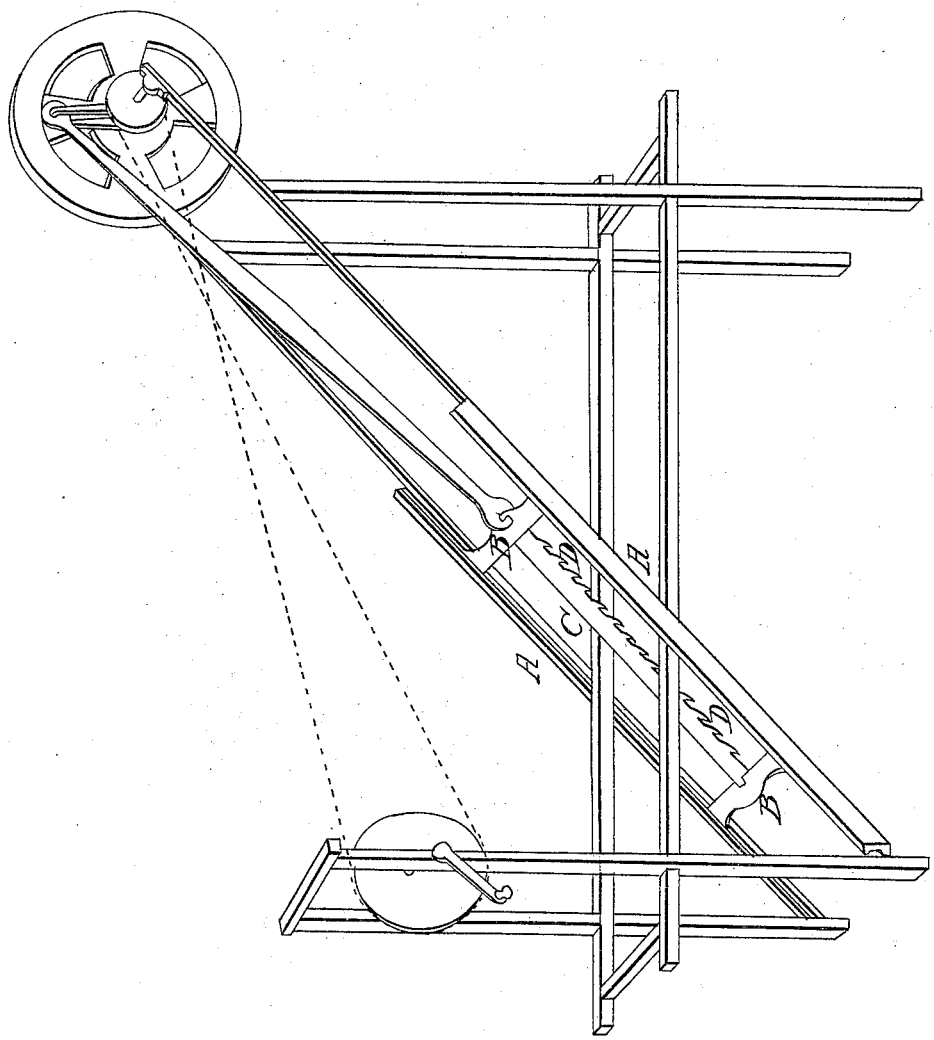

UNITED STATES PATENT OFFICE.

WM. BRYANT, OF DAVIDSON COUNTY, TENNESSEE.

SAWMILL.

Specification of Letters Patent No. 2,127, dated June 11, 1841.

*To all whom it may concern:*

Be it known that I, WILLIAM BRYANT, of the county of Davidson and State of Tennessee, have invented a new and useful Improvement in Sawmills; and I hereby declare that the following is a full and exact description.

The nature of my invention, consists in placing the guides which direct the saw, at such an angle with the lengthwise direction of the log, or timber to be sawed, that the shavings, or parings, in being cut by the saw, are peeled, or raised in the lengthwise direction of the log.

To enable others to make and use my invention, I proceed to describe its construction and operation.

I construct the mills, much as common mills are made, except the guides A, A, in which the saw gate B, B, runs, are placed at an angle of about 45°, with the longitudinal direction of the log or timber to be sawed; the angle may be more or less than 45°, but I find that angle for the saw c, to be very suitable; the saw teeth D, D, are more hooked, or project more forward than the common mill saw teeth.

The carriage and log may be moved forward to the saw, by a screw and rack, or by other means used for that purpose.

Motion is given to the saw in the common manner, by a crank moving a pitman, in the line or direction of the guides; the crank and pitman may be placed either above or below the saw.

What I claim as my invention and desire to secure by Letters Patent, is—

The placing the guides which direct the saw, at such an angle with the log, or timber to be sawed, that the shavings in being cut, are peeled or raised and carried forward by the teeth of the saw, in the lengthwise direction of the timber sawed.

WILLIAM BRYANT.

Witnesses:
 WILLIAM JAMES,
 JOHN WRIGHT.